United States Patent
Gilliam et al.

[15] 3,650,809

[45] Mar. 21, 1972

[54] POLYETHYLENE COATED METAL SUBSTRATE AND PROCESS OF PREPARING SAME

[72] Inventors: Kenneth D. Gilliam, Cedar Lake, Ind.; Alfred W. Kehe, Berkeley, Ill.

[73] Assignee: Continental Can Company, Inc., New York, N.Y.

[22] Filed: Sept. 15, 1969

[21] Appl. No.: 858,164

[52] U.S. Cl. ................117/75, 99/182, 117/21;95;132 C, 156/334
[51] Int. Cl. .................................B44d 1/14, B32b 15/08
[58] Field of Search..................117/75, 132 C; 156/334; 161/218, 215, 252, 254

[56] References Cited

UNITED STATES PATENTS

| | | | |
|---|---|---|---|
| 3,057,746 | 10/1962 | Edmonds | 117/75 X |
| 3,399,071 | 8/1968 | Schaufelberger et al. | 117/12 |
| 3,493,453 | 2/1970 | Ceresa et al. | 156/334 X |
| 3,522,126 | 7/1970 | Ptak | 117/75 X |

Primary Examiner—William D. Martin
Assistant Examiner—Ralph Husack
Attorney—Paul Shapiro, Joseph E. Kerwin and William A. Dittmann

[57] ABSTRACT

A method for bonding polyethylene to an enamel coated metal surface wherein there is employed as a bond promoting interlayer between the polyethylene and enamel coated metal surface a resinous mixture of a carboxyl containing polyethylene resin and a vinyl butyral polymer. The polyethylene coated metal surface is suitable for the manufacture of metal containers.

9 Claims, No Drawings

POLYETHYLENE COATED METAL SUBSTRATE AND PROCESS OF PREPARING SAME

BACKGROUND OF THE INVENTION

1. Field of the Invention

The present invention relates generally to a method of preparing coated articles and to articles produced thereby and more particularly, to an improved method of applying polyethylene coatings to metal surfaces to provide articles having strongly adherent protective coatings of polyethylene.

2. The Prior Art

Machine operations involved in metal container fabrication such as stamping, bending, drawing, punching, and the like, are particularly severe upon resinous coatings or films adhering to the sheet metal, and in many instances, it is extremely difficult to obtain a formed object with a coating film system adequate for the environment to which the finished article is to be subjected when in use.

To illustrate, many types of films and particularly those made from resinous materials, crack or peel when subjected to the foregoing mechanical operations. Because of the great economic advantage of coating or laminating the sheet metal prior to the various forming operations, the importance of a coating or film system which will withstand the various forming operations without injury cannot be overestimated.

Another quality of extreme importance, particularly in the case of certain uses to which the finished articles are to be put is the relative insolubility and chemical inertness of the film or film system. An example of such use is in the food packaging field in which metal cans and metal foil wrappings are extensively used.

In the case of cans, for example, economic considerations make it extremely advantageous to apply the coatings or film system to the metal sheet while in the flat. The can parts are then cut, shaped and joined, all in a manner well known to the art. Severe stresses are set up during the forming operations, particularly in the case of the die-drawing of the can ends. The can ends and portions of the can body are again subjected to severe stresses by the seaming chuck, seaming rolls, and cooperating parts of the can closing machine during the well-known double-seaming can sealing operation. A coating or film system, to be successful, must withstand such and similar metal working operations reasonably well with a minimum of peeling, rupturing, or scuffing.

Ethylene polymers, such as polyethylene, can provide protective properties not equalled by any other synthetic thermoplastic polymer at comparable cost. The chief characteristic of ethylene polymers, such as polyethylene, which makes them highly advantageous as coating materials, is their inertness to chemical, atmospheric and solvent attack. However, this characteristic of inertness is also responsible for the fact that these polymeric materials have very poor adhesion to non-porous substrates, such as metal.

The valuable properties of polyethylene makes its use in conjunction with metal substrates such as steel, desirable, but heretofore such uses have been limited by the difficulty of obtaining strong bonds between polyethylene in contact with such substrates.

SUMMARY OF THE INVENTION

In accordance with the present invention, there is provided an improved method for applying a layer of polyethylene to metal surfaces which produces metal articles having strongly adhering layers of polyethylene wherein there is first applied to the metal surface a thermosetting enamel coating material. The enamel coating is hardened and to the hardened coating is applied, before the application of the polyethylene layer, a bond-promoting interlayer of resinous mixture of a carboxyl containing polyethylene resin and a vinyl butyral polymer.

PREFERRED EMBODIMENTS

In the process of the present invention, any of the thermosetting resins conventionally used in the coating art may be employed for enamel coating the metal substrate.

Typical thermosetting resins which may be employed as enamel coatings include epoxy resins of the type which are polymeric reaction products of polyfunctional halohydrins with polyhydric phenols having the structural formula:

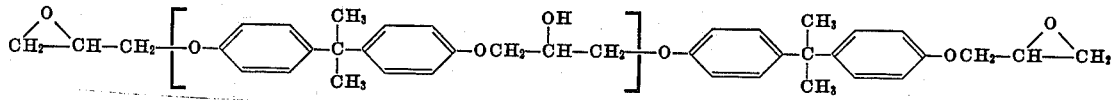

wherein $x$ represents the number of molecules condensed. Typical polyfunctional halohydrins are epichlorohydrin, glycerol dichlorohydrin and the like. Typical polyhydric phenols are resorcinol and a 2,2-bis(4-hydroxyphenyl) alkane, the latter resulting from the condensation of phenols with aldehydes and ketones, including formaldehyde, acetaldehyde, propionaldehyde, acetone, methyl ethyl ketone and the like, which result in such compounds as 2,2-bis(4-hydroxyphenyl) propane and the like compounds. These epoxy resins normally contain terminal epoxy groups but may contain terminal epoxy groups and terminal hydroxyl groups.

In place of or in admixture with the epoxy resins, any of the well-known class of heat-hardenable phenolic resins produced by condensing a phenolic compound with an aldehydic compound may be employed as thermosetting enamel coating materials.

Exemplary phenols suitable for the preparation of phenol/formaldehyde resins include phenol itself, the ortho-, para- and meta-cresols, the xylenols, the dihydroxy benzenes, such as resorcinol, the polynuclear phenols, such as the naphthols, and the various alkylated, arylated, carboxylated, alkylolated, etc., derivatives of these types, such as o-ethyl phenol, salicylic acid and the like.

Formaldehyde is the aldehydic compound preferred for condensation with the phenolic compound, but in general, any methylene-containing agent, such as formaldehyde, paraformaldehyde, hexamethylene tetramine, acetaldehyde, and the like may be used.

Amine-aldehyde resins may also be employed in preparing thermosetting enamel coatings, either separately or in combination with epoxy and/or phenolic resins.

THe term "amine-aldehyde" resin includes aldehyde condensation products of melamine, urea, aceto-guanamine, or a similar compound. Generally, the aldehyde employed is formaldehyde, although useful products can be made from other aldehydes, such as acetaldehyde, crotonaldehyde, acrolein, benzaldehyde, furfural, and others. Condensation products of melamine or urea are the commonly employed amine-aldehyde resins.

Other thermosetting resins which may be employed as enamel coating materials include polybutadiene, oleoresins based on china-wood or tung oil, oleoresin/formaldehyde resins and combinations of these resins with each other and the above-described resins.

Certain thermoplastic resins may be employed in combination with the thermosetting resin mentioned above to prepare enamel coatings having thermosetting properties. These thermoplastic resins include the vinyl chloride polymer resins, such as polyvinyl chloride, vinyl chloride/vinyl acetate copolymers, vinyl chloride/vinylidene chloride copolymers, vinyl chloride/alkyl maleate copolymers, vinyl chloride/acrylonitrile copolymers, vinyl chloride/vinyl acetate/vinyl alcohol copolymers, vinyl chloride/vinyl acetate/maleic anhydride copolymers, ethylene/vinyl acetate copolymers, ethylene/ethylene acrylate copolymers, and the like.

A typical example of a thermosetting enamel coating incorporating a thermoplastic vinyl chloride polymer resin is a mixture of about 80 percent by weight of a vinyl chloride-vinyl acetate copolymer composed of 87 percent vinyl chloride and 13 percent vinyl acetate, and 20 percent by weight of an oleoresinous modifier, specifically tung oil modified phenol-formaldehyde resin.

For application to metal surfaces, the above-described resins or mixtures of these resins are dissolved in suitable solvent systems, such as organic ketones, such as methyl ethyl ketone, methyl isobutyl ketone, isophorone, cyclohexanone, and aromatic hydrocarbons, such as xylene and toluene, and mixtures thereof, to provide a coating solution of the necessary viscosity for application to the metal surfaces.

The thermosetting enamel coating compositions are applied as a liquid solution to the metal surface by any of the conventional methods employed by the coating industry. In the coating of metal sheet used in container fabrication, roller coating is a preferred method as the deposited coating weight is easily and conveniently applied in a single coat. For general coating purposes, spraying, dipping, and flow coating are useful methods of application.

The applied coating after substantial volatile loss of solvent is cured to a hard film by heating the coated substrate at temperature between about 150° and about 235° C. for about 1 to 10 minutes. The preferred coating weight for use as an enamel for containers is in the range of about 1 to 5 milligrams of dry coating per square inch of substrate surface.

The metal sheet stock, coated with the hardened enamel coating, in accordance with the present invention, is coated with an adhesion promoting layer of a mixture of a carboxyl containing polyethylene resin and vinylbutyral polymer resin.

The carboxyl modified polyethylene which is utilized in the practice of the present invention is a low molecular weight resin prepared by grafting an unsaturated dicarboxylic acid or anhydride onto a polyethylene backbone. The polyethylene resin used as the backbone has a density about 0.94 and preferably about 0.96 to 0.97 and a molecular weight of from 1,500 to 4,000. Unsaturated dicarboxylic acids or anhydrides which can be employed to prepare the carboxyl modified polyethylene resins of the present invention include maleic, tetrahydrophthalic acid, fumaric acid, itaconic, nadic, methyl nadic and their anhydrides.

The amount of unsaturated dicarboxylic acid or anhydride which can be grafted onto the polyethylene ranges from about 0.05 to about 10 percent by weight, based on the total weight of the grafted polymer, and preferably, the amount of grafted dicarboxylic acid or anhydride ranges from about 1 to about 10.0 percent.

The modified polymers can be prepared by reacting the unsaturated dicarboxylic acid, or anhydride, such as maleic anhydride, with a low molecular weight polyethylene containing active sites which are capable of anchoring the dicarboxylic acid or anhydride thereon. Active centers at which anchoring will occur can readily be induced on the polyethylene resin surface in known ways, as, for example, by subjecting the polyethylene to the action of high energy ionizing radiations or by contacting the polymer either as a solid or in solution in a solvent, with a free radical producing material, such as dibenzoyl peroxide, dilauroyl peroxide, dicumyl peroxide, t-butyl perbenzoate, and the like, at a temperature from about 130° to about 250° C. Preferably, the carboxyl modified polyethylene resin is prepared by reacting maleic anhydride with a solution of the polyethylene in an organic solvent containing a free-radical producing material, such method being described in U.S. Pat. No. 3,399,071.

The vinyl butyral polymers used in the process described herein are generally well known in the art. As used herein, the term "vinyl butyral polymer" is meant to include poly(vinyl butyral) per se or polymers containing vinyl butyral linkages amounting to at least 50 percent of the polymer chain. That is to say, in the production of vinyl butyral polymers, the starting material is poly (vinyl acetate) or poly(vinyl alcohol). If poly(vinyl acetate) is used, it is first hydrolyzed to an alcohol and the resultant polymer is then reacted with an aldehyde (butyraldehyde) to produce the polymer of vinyl butyral. If poly(vinyl alcohol) is used, only the aldehyde reaction is carried out. Depending upon the degree of hydrolysis and the amount of aldehyde used, the resultant polymer may contain all butyral units or it may contain some unhydrolyzed acetate groups and/or some unreacted alcohol groups. As a result, these polymers are either vinyl butyral homopolymers or copolymers or terpolymers of vinyl butyral and vinyl alcohol and/or vinyl acetate. Use of polymers of this type is within the scope of the instant invention. These vinyl butyral polymers and methods for their production are more fully described in one or more of the following U.S. Pat. Nos. 2,282,026 and 2,400,957, which patents are hereby incorporated herein by reference.

An example of a polyvinyl butyral resin useful in the present invention has a molecular weight between about 30,000 to 300,000, has a butyral content of between about 80 to about 90 percent calculated as polyvinyl butyral, a content of free hydroxy groups of between about 10 percent and about 20 percent by weight calculated as polyvinyl alcohol, and a content of free acetate groups of between about 1 percent and 2.5 percent by weight, calculated as polyvinyl acetate.

The adhesion promoting resin mixture of carboxyl containing polyethylene and vinyl butyral polymer are generally applied to the enamel coated metal article surface as a dispersion in volatile organic solvents, such as tetrahydrofuran, diacetone alcohol, xylol, methyl isobutyl ketone, toluol, and isopropyl alcohol.

In the dispersion, the carboxyl containing polyethylene resin comprises about 10 to about 99 percent by weight of the nonvolatile constituents of the dispersion and the vinyl butyral polymer resin comprises about 1 to about 90 percent by weight of the nonvolatile constituents of the dispersion. Preferably, the carboxyl containing polyethylene resin comprises about 60 to about 80 percent by weight of the nonvolatile constituents of the dispersion, and the vinyl butyral polymer resin comprises about 20 to about 40 percent by weight of the nonvolatile constituents of the dispersion.

The dispersion containing the carboxyl modified polyethylene-vinyl butyral polymer resin adhesion promoting mixture of this invention can be satisfactorily applied at a solids content ranging from about 5 to about 20 percent by weight, based on the total weight of the liquid dispersion composition. Generally, a solids content of 13 to about 15 percent by weight is preferred.

The dispersion containing the adhesion promoting composition can be satisfactorily applied by any of the conventional methods employed by the coating industry. However, for coating of enameled sheet metal used in container fabrication, direct or reverse roll coating is a preferred method, as the desired coating weight is easily and conveniently applied in a single coat. Spraying, dipping and flow coating are also useful methods of applying the finishing varnish.

After applying the dispersion, the volatile components are volatilized by heating the coated substrate at a temperature of about 150° to about 235° C. for about 1 to about 3 minutes.

To provide the enamel coated metal sheet substrates with an adequate adhesion promoting coating for polyethylene, the dry film weight of the bond promoting layer should be in the range of 1 to 5 milligrams of dry coating per square inch of enamel coated surface.

The polyethylene coating applied to the bond promoting layer of carboxyl containing polyethylene and vinyl butyral polymer may be any of the presently commercially available high, medium or low density polyethylenes. High density polyethylene has a density from 0.941 to 0.965 and a melt index of from 0.2 to 5. A medium density polyethylene has a density in the range of from 0.926 to 0.940, and a melt index of 0.3 to 22. Low density polyethylene has a density of 0.910 to 0.925, and a melt index of from 0.3 to 22.

The polyethylene coating is applied to the bond promoting resin mixture layer of carboxyl containing polyethylene and vinyl butyral polymer at a thickness of approximately 0.5 to 50 mils by any suitable method. For example, the polyethylene resin in powdered form may be applied by sifting, sprinkling, fluidized bed, spraying or electrostatic deposition. If desired, the powdered polyethylene may be extrusion coated in the form of a sheet on the bond-promoting layer. During the application of the polyethylene, the metal substrate is maintained at temperature of at least 175° C. and generally 180° to 235° C., the exact temperature depending upon the melting point of the polyethylene used. In each case, however, the metal should be maintained at a temperature sufficient to melt the specific type of polyethylene used and to keep it molten until the metal has been completely covered and a coating of the desired thickness has been formed. The polyethylene may also be bonded to the primer coating via dielectric, ultrasonic, impulse heat sealing methods. The coated metal may then be cooled in any suitable manner, as by air cooling, by a water quench, such as flooding with water, plunging into a water bath, or any other appropriate procedure that does not disturb the applied coating.

To illustrate the manner in which the present invention may be carried out, the following example is given. It is to be understood, however, that the example is for the purpose of illustration, and the invention is not to be regarded as limited to any of the specific materials or conditions recited therein.

EXAMPLE

A solution of a mixture of urea-formaldehyde/epoxy resin reaction product in a volatile solvent was applied to the surface of a chrome plated steel sheet by means of a roller to deposit an enamel coating at a coating weight of 3 mg./in.$^2$ of steel surface. The coating was heated for 10 minutes at 204° C. to remove the solvent and to cure the mixture to a hard enamel film.

A bond-promoting coating formulation was prepared from a mixture of a carboxyl containing polyethylene resin and vinyl butyral polymer resin.

The carboxyl containing polyethylene resin was prepared by the following procedure:

Ninety parts of a polyethylene resin having a molecular weight of about 3,000 and a density of 0.097 was admixed with 6 parts of maleic anhydride, 2 parts of dicumyl peroxide, and suspended in 200 parts of toluene. The reaction mixture was placed in a pressure autoclave under an atmosphere of nitrogen and continuously agitated while being heated at a temperature of 140° C. for 6 hours. The resultant graft copolymer was separated from the toluene, rinsed with acetone, and dried.

The vinyl butyral polymer resin was Butvar B-90, available from the Monsanto Chemical Company, which had a molecular weight of 40,000, a butyral content of 80 percent, a hydroxy content of about 19 percent, and an acetate content of about 1.0 percent.

The bond-promoting coating formulation having a solids content of 13 percent had the following composition:

| Component | Parts by Weight |
| --- | --- |
| Carboxyl containing polyethylene resin | 8.5 |
| Vinyl butyral polymer resin | 4.5 |
| Methylisobutyl ketone | 11.0 |
| Diacetone alcohol | 29.0 |
| Xylene | 47.0 |

The dispersion prepared above was spread as a thin film over a 1-inch square area at one end of 1 inch × 6 inch × 6 mil strips of enamel coated steel which had been cut from the enamel coated sheet.

After application of the carboxyl containing polyethylene/vinyl butyral polymer mixture to the enamel coated surface of the steel, the sheet was baked at 140° C. to volatilize the solvent, fuse and coalesce the dispersed particles into a continuous film. To the carboxyl containing polyethylene/vinyl butyral coated area of the steel surface was applied a 0.050 inch × 1 inch × 1 inch strip of untreated polyethylene having a density of 0.930 and a melt index of 6.

The assembly was heated to 232° C. for 4 seconds under light pressure (20 p.s.i.) to insure intimate contact of the polyethylene film with the coated surface of the steel strip, during which time the coating became molten. The assembly was then cooled and the peel strength of the assembly was determined.

The peel strength of the assembly, i.e., a measure of the load required to peel apart the adhered layers, was determined by pulling the polyethylene film and steel strip apart at an angle of 180° to the bond in an Instron machine at a rate of 0.5 inch per minute.

For purposes of contrast, the above procedure was repeated with the exception that in separate runs, the aforementioned polyethylene, polyvinyl butyral and carboxyl containing polyethylene resins, and a mixture of the polyethylene/polyvinyl butyral mixture (weight ratio of 8.5:4.5), was used in place of the carboxyl containing polyethylene/vinyl butyral polymer blend. The peel strengths of these strip assemblies are summarized in the table below.

TABLE

| Coating Material Applied to Enameled Steel Surface as Adhesion Promoting Layer | Peel Strength grams/linear inch |
| --- | --- |
| 1. Polyethylene | 0* |
| 2. Polyvinyl butyral | 0* |
| 3. Carboxyl containing polyethylene | 0* |
| 4. Polyethylene/polyvinyl butyral | 0* |
| 5. Carboxyl containing polyethylene/ vinyl butyral polymer | 3000 |

*no measurable adhesion

By reference to the above table, it is immediately apparent that the carboxyl containing polyethylene/vinyl butyral polymer mixture provides a bond promoting surface for bonding polyethylene to enameled metal surfaces which exhibits substantially greater peel strength than when the separate components are used individually.

What is claimed is:

1. A process of preparing a metal article having a polyethylene coated surface which comprises the sequential steps of:
   a. applying a thermosetting enamel coating material to the surface of a metal and curing the enamel coating;
   b. applying to the cured enamel coated metal surface a bond promoting layer of a mixture of about 10 to 99 percent by weight of the reaction product of polyethylene and an unsaturated dicarboxylic acid or anhydride containing about 0.05 to about 10 percent by weight of the acid or anhydride and about 1 percent to about 90 percent by weight of a vinyl butyral polymer resin; and then
   c. applying to the bond promoting layer a layer of polyethylene.

2. The process of claim 1 wherein the polyethylene reaction product has a density greater than 0.94, a molecular weight of from about 1,500 to about 4,000, and contains about 1 to about 10 percent carboxyl groups.

3. The process of claim 2 wherein the unsaturated anhydride is maleic anhydride.

4. The process of claim 1 wherein the vinyl butyral polymer resin has a molecular weight between about 30,000 to about 300,000, a butyral content of between about 80 to about 90 percent, calculated as polyvinyl butyral, a hydroxy content of between about 10 percent and about 20 percent by weight, calculated as polyvinyl alcohol, and an acetate content of between about 1 percent and 2.5 percent by weight, calculated as polyvinyl acetate.

5. A metal article coated with a cured thermosetting enamel coating having an adherent uniform layer of polyethylene bonded through an intermediate bond promoting layer of a resinous mixture of about 10 to about 99 percent by weight of the reaction product of polyethylene and an unsaturated dicarboxylic acid or anhydride containing about 0.05 to about 10 percent by weight of the acid or anhydride and about 1 to about 90 percent by weight of a vinyl butyral polymer resin.

6. The article of claim 5 wherein the polyethylene reaction product has a density greater than 0.94, a molecular weight of from about 1,500 to about 4,000, and contains about 1 to about 10 percent carboxyl groups.

7. The article of claim 5 wherein the carboxyl containing polyethylene resin is the reaction product of polyethylene and an unsaturated dicarboxylic acid or anhydride.

8. THe article of claim 5 wherein the unsaturated anhydride is maleic anhydride.

9. The article of claim 5 wherein the vinyl butyral polymer resin has a molecular weight between about 30,000 to about 300,000, a butyral content of between about 80 to about 90 percent, calculated as polyvinyl butyral, a hydroxy content of between about 10 percent and about 20 percent by weight, calculated as polyvinyl alcohol, and an acetate content of between about 1 percent and 2.5 percent by weight, calculated as polyvinyl acetate.

* * * * *